United States Patent [19]
Kao et al.

[11] Patent Number: 5,055,505
[45] Date of Patent: Oct. 8, 1991

[54] HEAT STABILIZED ABS-POLYCARBONATE POLYMER BLEND COMPOSITIONS

[75] Inventors: Hsin-Ching Kao; Mao-Mong Lee, both of Hsin-Chu; Chih-Cheng Chiang, Tau-Yuan; Jen-Lien Lin, Hsin-Chu; Ting-Kai Wu, Taipei, all of Taiwan

[73] Assignee: Industrial Technology Research Institute, Hsinchu, Taiwan

[21] Appl. No.: 514,221

[22] Filed: Apr. 25, 1990

[51] Int. Cl.$^5$ .......................... C08K 5/46; C08K 5/48; C08K 3/34
[52] U.S. Cl. ........................ 524/83; 524/93; 524/191; 524/791; 524/442
[58] Field of Search ................. 524/83, 93, 191, 442, 524/791

[56] References Cited
U.S. PATENT DOCUMENTS

| | | | |
|---|---|---|---|
| 3,884,874 | 5/1975 | Rosenberger et al. | 524/191 |
| 4,472,554 | 9/1984 | Grigo et al. | 525/67 |
| 4,818,777 | 4/1989 | Braig | 524/83 |

*Primary Examiner*—Kriellion S. Morgan
*Attorney, Agent, or Firm*—Cushman, Darby & Cushman

[57] ABSTRACT

A polycarbonate blend composition comprising 95-5 wt % of a polycarbonate resin, 5-95% of an ABS resin and 0-01-5 parts per hundred of a heat stabilizer (relative to the combined resin weight). The heat stabilizers are selected from benzothiazoles of formula:

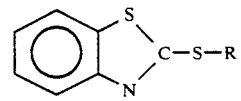

wherein R is selected from hydrogen, alkyl, aryl and benzothiazolyl; benzimidazole compounds of formula:

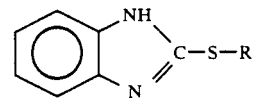

wherein R is selected from hydrogen, alkyl, aryl and benzimidazolyl; hydrazine compound of formula:

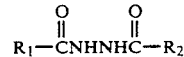

wherein R is alkyl, and cation exchange materials selected from metal salts of silicaluminate zeolites, metal salts of triphosphates and cation exchange resins. These poly blend composition display improved impact resistance.

8 Claims, No Drawings

HEAT STABILIZED ABS-POLYCARBONATE POLYMER BLEND COMPOSITIONS

DESCRIPTION OF THE INVENTION

The present invention relates to a polycarbonate/ABS blend compositions having improved impact resistance. The present compositions comprise a combination of polycarbonate, ABS resin and heat stabilizer.

In recent years, heat stability and impact resistance were required in molding thermoplastic resins which have certain special uses. Under these circumstances, general purpose grade plastics and ABS resins are unable to satisfy these performance requirements. Instead, expensive heat stable engineering plastics such as polycarbonate (PC), polysulfone (PSF) and polyphenylene oxide (PPO) were developed to solve these problems. These high performance resins are not only expensive, but also are difficult to process. In order to improve processing and heat resistance, the simplest way is to use polymer blending techniques, for example, PC/ABS polyblends exhibit very balanced mechanical properties and processability. These polyblending techniques have been described, for example, in Japan Patent Application 38-15225, 39-71, and 42-11496.

However, there are unstable quality conditions during blending of PC/ABS resins. The causes of this unstability were believed to be associated with residual impurities present in common preparation procedures for forming ABS. These impurities include emulsifiers, migrating agent, and suspension stabilizer. These trace impurities influnce PC in such a way that, during the melt blending of PC and ABS under elevated temperature, PC resin might be degraded due to heat decomposition. The heat degradation can lead to lower physical properties and darken color. Furthermore, the degree of degradation in blending of PC/ABS is more severe than that in molding of PC alone. In order to overcome these drawbacks, Japan Patent 56-131657 described use of organic and inorganic acids as heat stabilizers of PC/ABS polyblends, while U.S. Pat. No. 4,472,554 disclosed high molecular acids as heat stabilizer of PC/ABS polyblend.

Thus, the instant invention provides four types of compounds as heat stabilizers of PC/ABS polyblends:

(1) benzothiazole compounds;
(2) benzimidazole compounds;
(3) hydrazine compounds;
(4) cation exchange materials.

suitable polycarbonates for use in the present invention include those selected from aromatic polycarbonate, aliphatic polycarbonate, aliphatic-aromatic polycarbonate or halogen-substituted bisphenol-A polycarbonates.

Suitable ABS resins for use in the present invention include those selected from resins prepared by emulsion, suspension or solution polymerizations of cyanovinyl compounds, for example, acrylonitrile, conjugated dienes compounds, for example, butadiene, and aromatic-vinyl compounds, for example, styrene; or the polyblend prepared by melt blending of the above prepared resins with cyanovinyl-aromatic vinyl copolymer, for example, ABS/acrylonitrile-styrene copolymer blend.

The benzothiazole compounds suitable for use in the instant invention are compounds of general formula (I)

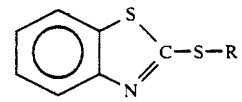

where R is selected from hydrogen, alkyl, aryl or benzothiazolyl.

The benzimidazole compounds suitable for use as heat stabilizer in the instant invention include compounds of general formula (II)

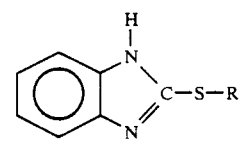

where R is selected from hydrogen, alkyl, aryl or benzimidazolyl.

Suitable hydrazine compounds for use as heat stabilizer in the instant invention include compounds of general formula (III)

$$R_1-\overset{O}{\underset{\|}{C}}NHNH\overset{O}{\underset{\|}{C}}-R_2 \quad (III)$$

where $R_1$ and $R_2$ are independently selected from alkyl, aryl or alkyl- or aryl-substituted aryl.

The cation exchange material suitable for use as heat stabilizer in the instant invention comprise various cation salts of silicaluminates, where cations may be sodium, potassium, lithium, calcium, strotium or barium; zeolites having various mole number of crystalline water; metal salts of tripolyphosphate, where the metal ions may be sodium, potassium, calcium, strontium, or barium; or other cation exchange resins.

The amount of the above described heat stabilizer in the instant invention is in the range in the 0.01 to 5 phr (part per hundred part) based on the total weight of the PC/ABs polyblend.

The improvement of impact resistance of the polycarbonate polyblend through incorporation of the heat stabilizers of the present invention can be illustrated by the following examples, which are not meant to limit the instant invention. Data and figures in the tables are based on weight units unless stated otherwise.

EXAMPLES

The methods used in comparative examples 1-3 and examples 1-24 involve the drying of ABS and PC resins, compounding the resins according to suitable ratio, blending in extruder (blending temperature 220°-250° C., screw speed at 150 rpm), pelletizing and drying. The resulting material is injection molded into test specimens specified by ASTM and subjected to impact resistant test in accordance with ASTM D-256.

Data in Table 1 shows the effect of two benzothiazole type heat stabilizers on the impact strength of PC/ABS polyblend composition. As can be seen, heat stabilizers were not used in the three comparative examples while the types and amount of heat stabilizers used in examples 1-6 were listed in the Table together with the compositions of PC/ABS polyblend. Where similar polymer compositions were used, the impact strengths obtained in examples 1-6 were significantly higher than those obtained in corresponding comparative example 1-3. The improvements of impact strength of PC/ABS 75% were increased to 25, 30 and 2 times, respectively.

TABLE 2

The effect of benzimidazole type heat stabilizer on the impact strengths of PC/ABS polyblend compositions.

|  |  | Comparative examples | | | Examples | | | | | |
|---|---|---|---|---|---|---|---|---|---|---|
|  |  | 1 | 2 | 3 | 7 | 8 | 9 | 10 | 11 | 12 |
|  | ABS | 75 | 50 | 25 | 75 | 75 | 50 | 50 | 25 | 25 |
|  | PC | 25 | 50 | 75 | 25 | 25 | 50 | 50 | 75 | 75 |
| heat stabilizer | *D—R, R = hydrogen | — | — | — | 0.1 | — | 0.5 | — | 1.0 | — |
|  | D—R, R = D | — | — | — | — | 0.3 | — | 0.5 | — | 0.8 |
|  | Impact Strength, notched, ft-lb/in | 0.2 | 0.5 | 8.0 | 5.5 | 5.1 | 15.1 | 15.5 | 13.6 | 14.0 |

*D = $C_6H_4NHNCS$ polyblend can be ascribed to the interaction of benzothiazole compounds with the impurities in ABS, for example migrating agent, so as to inhibit the thermal decomposition of PC during high temperature blending.

Table 3 shows the effect of 2 hydrazine type heat stabilizers on the impact strengths of PC/ABS polyblend compositions. Similarly, the impact strength in example 13-18 which include heat stabilizer were significantly improved over comparative examples which

TABLE 1

The effect of benzothiazole type heat stabilizer on the impact strength of PC/ABS polyblend compositions.

|  |  | Comparative examples | | | Examples | | | | | |
|---|---|---|---|---|---|---|---|---|---|---|
|  |  | 1 | 2 | 3 | 1 | 2 | 3 | 4 | 5 | 6 |
|  | ABS | 75 | 50 | 25 | 75 | 75 | 50 | 50 | 25 | 25 |
|  | PC | 25 | 50 | 75 | 25 | 25 | 50 | 50 | 75 | 75 |
| heat stabilizer | *G—R, R = hydrogen | — | — | — | 0.3 | — | 0.5 | — | 0.2 | — |
|  | G—R, R = G | — | — | — | — | 0.7 | — | 0.5 | — | 1.0 |
|  | Impact Strength, notched, ft-lb/in | 0.2 | 0.5 | 8.0 | 5.0 | 4.3 | 14.5 | 12.0 | 14.2 | 13.8 |

*G = $C_6H_4SNCS$

Table 2 shows the effect of benzimidazole type heat did not include heat stabilizers.

TABLE 3

The effect of hydrazine type heat stabilizers on the impact strength of PC/ABS polyblend compositions.

|  | Comparative examples | | | Examples | | | | | |
|---|---|---|---|---|---|---|---|---|---|
|  | 1 | 2 | 3 | 13 | 14 | 15 | 16 | 17 | 18 |
| ABS | 75 | 50 | 25 | 75 | 75 | 50 | 50 | 25 | 25 |
| PC | 25 | 50 | 75 | 25 | 25 | 50 | 50 | 75 | 75 |
| heat stabilizer |  |  |  |  |  |  |  |  |  |
| *$R_1$—A—$R_2$, $R_1 = R_2 = C_2H_4$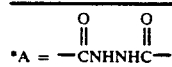—OH | — | — | — | 0.8 | — | 0.5 | — | 0.1 | — |
| $R_1$—A—$R_2$, R = $C_{10}H_{20}$, $R_2$ = phenyl | — | — | — | — | 0.2 | — | 0.5 | — | 1.0 |
| Impact Strength, notched, ft-lb/in | 0.2 | 0.5 | 8.0 | 4.1 | 4.6 | 14.9 | 13.5 | 13.1 | 13.4 |

*A = $-\overset{O}{\underset{\|}{C}}NHNH\overset{O}{\underset{\|}{C}}-$ stabilizers on the impact strength of PC/ABS polyblend compositions. The polymers used in comparative examples 1 to 3 do not include the said heat stabilizer. The types and amounts of heat stabilizers used in example 7-12 are shown together with polymer composition in each example. The impact strengths obtained were significantly enhanced, wherein, the impact strengths obtained in examples with PC composition 25%, 50% and Table 4 shows the effect of two types of cation exchange materials as the heat stabilizer on the impact strengths of PC/ABS polyblend compositions. The impact strengths obtained in example 19-24 which included with said heat stabilizers showed improved results as compared to the corresponding comparative examples 1-3.

TABLE 4

The effect of cation exchange materials on the impact strengths of PC/ABS polyblend compositions.

| | | Comparative examples | | | Examples | | | | | |
|---|---|---|---|---|---|---|---|---|---|---|
| | | 1 | 2 | 3 | 19 | 20 | 21 | 22 | 23 | 24 |
| | ABS | 75 | 50 | 25 | 75 | 75 | 50 | 50 | 25 | 25 |
| | PC | 25 | 50 | 75 | 25 | 25 | 50 | 50 | 75 | 75 |
| heat stabilizer | Zeolite (NaX) | — | — | — | 0.5 | — | 0.5 | — | 0.3 | — |
| | Tripolyphosphate | — | — | — | — | 0.9 | — | 0.5 | — | 0.7 |
| | Impact Strength, notched, ft-lb/in | 0.2 | 0.5 | 8.0 | 5.7 | 4.6 | 15.0 | 12.8 | 14.1 | 13.0 |

The improved results of the use of the heat stabilizers of the present invention on the impact strength of PC/ABS polyblend compositions are clearly demonstrated by the forgoing examples.

We claim:

1. A polycarbonate polymer blend composition comprising 95-5 weight percent polycarbonate resin, 5-95 weight percent ABS resin, and 0.01-5 phr of heat stabilizer, based on the total weight of polycarbonate and ABS resin; wherein the heat stabilizer is selected from the group consisting of a benzothiazole compound of formula

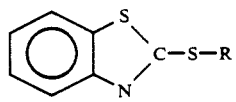

wherein R is selected from hydrogen, alkyl, aryl and benzothiazolyl, wherein the aryl group is not phenol or substituted phenol; a benzimidazole compound; a hydrazine compound; of formula,

wherein $R^1$ and $R^2$ are independently, selected from alkyl, and cation exchange materials.

2. A composition as claimed in claim 1, wherein the polycarbonate resin is selected from the group consisting of aromatic polycarbonate, aliphatic polycarbonate, aliphatic-aromatic polycarbonate and halogen-substituted bisphenol-A type polycarbonate.

3. A composition according to claim 1, wherein the heat stabilizer is a benzimidazole compound of structural formula

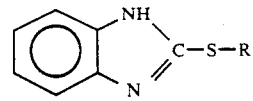

where R is selected from the group consisting of hydrogen, alkyl, aryl and benzimidazolyl.

4. A composition as claimed in claim 1, wherein the heat stabilizer is a cation exchange material which is selected from metal salts of silicaluminates, wherein said metals are selected from sodium, potassium, lithium, calcium, strontium or barium; zeolites with various mole number of crystalline water, for example, zeolite A, zeolite X, zeolite Y, Mordenite, silicalite; tripolyphosphates; and cation exchange resins.

5. A process for preparing polycarbonate polyblend compositions described in claim 1, said process comprising the steps of drying and blending 95-5 weight percent polycarbonate resin, 5-95 weight percent ABS resin and 0.01-5 phr of heat stabilizer, based on the total weight of polycarbonate and ABS resin; where said heat stabilizer is selected from benzothiazole compounds; benzimidazole compounds; hydrazine compounds; and cation exchange materials;

then compounding and blending in an extruder at 220°-250° C., extruding and pelletizing.

6. A composition as claimed in claim 1, wherein the ABS resin is a terpolymer prepared by emulsion, suspension or solution polymerization of cyanovinyl monomers with conjugated diene monomers and aromatic vinyl monomers.

7. A composition as claimed in claim 6, wherein the ABS resin is prepared by melt blending said terpolymer with a cyanovinyl-aromatic vinyl copolymer.

8. A composition as claimed in claim 6, wherein the cyanovinyl monomer is acrylonitrile; the conjugated diene monomer is butadiene; and the aromatic vinyl monomer is styrene.

* * * * *